United States Patent

Ault et al.

[11] 4,041,415
[45] Aug. 9, 1977

[54] COAXIAL ELECTRON BEAM PUMPED LASER

[75] Inventors: Earl R. Ault, Rolling Hills Estates; Philip C. Stevens, Redondo Beach; Robert H. Sipman, Agoura; Robert S. Bradford, Jr., Los Angeles, all of Calif.

[73] Assignee: Northrop Corporation, Los Angeles, Calif.

[21] Appl. No.: 684,456

[22] Filed: May 7, 1976

[51] Int. Cl.² ............................................. H01S 3/097
[52] U.S. Cl. ...................................... 331/94.5 PE
[58] Field of Search ...................... 331/94.5; 330/4.3

[56] References Cited

PUBLICATIONS

Garnsworthy et al., Atmospheric Pressure Pulsed $CO_2$ Laser Utilizing Preionization by High-Energy Electrons, Appl. Phys. Lett., vol. 19, No. 12 (Dec. 15, 1971) pp. 506–508.

Primary Examiner—William L. Sikes
Attorney, Agent, or Firm—Edward A. Sokolski

[57] ABSTRACT

An e-beam pumped laser employs a hollow cylindrical anode and cathode structure, the cathode being externally concentric with the anode. The lasing gas is contained within a chamber formed by the anode, an optical oscillator cavity being formed between mirrors placed at opposite ends of the anode chamber. The laser gas is excited by means of an e-beam directed radially inwardly from the cathode through the walls of the anode, which are formed of a thin foil, into the laser gas cavity.

6 Claims, 3 Drawing Figures

COAXIAL ELECTRON BEAM PUMPED LASER

The Government has rights in this invention pursuant to Contract No. N00014-72-C-0456 awarded by the United States Navy.

This invention relates to e-beam pumped lasers and more particularly to such a laser employing a hollow coaxial anode and cathode for generating the e-beam, with the anode forming the lasing gas chamber.

Electron beam (e-beam) pumped lasers have in recent years found favor because of their capabilities for achieving high power with relatively high efficiency. Electron beam pumped lasers of the prior art have generally taken one or two forms. The first of these uses transverse pumping with the e-beam usually having a rectangular cross section and being allowed to enter one side of a rectangular gas cell through a thin foil. This configuration has a disadvantage in that the gas scatters the beam into the top and bottom of the cell, thereby wasting beam energy. The second configuration uses a cylindrical beam which is guided longitudinally along the optical axis by a magnetic field induced by magnetic field coils. In this configuration, beam scatter is also present which causes valuable energy to be lost in the cavity walls. This second configuration is further limited to low pressure operation.

The present invention overcomes the aforementioned shortcomings of the prior art by making use of the radial focusing inherent in its cylindrical geometry to minimize beam scattering by the foil and laser gas. With the coaxial design of the present invention, the electron beam energy is more effectively deposited in the laser gas and the total stored energy required to provide the same laser output is greatly reduced as compared with prior art devices.

Referring now to the drawings.

Briefly described, the device of the present invention is as follows: A hollow cylindrical anode structure is mounted in internal concentricity with a hollow cylindrical cathode. The cathode and anode are fabricated of a material such as aluminum or titanium, the anode being made of a thin foil which permits the passage of the e-beam therethrough to the laser cavity formed within the anode. The lasing gas, which may for example comprise a mixture of argon and nitrogen, is contained within the cavity formed by the anode structure and mirrors are placed at the opposite ends of this cavity to form a laser oscillator cavity. Foil blades may be placed on the inner walls of the cathode shell and form cold cathode emitters of the e-beam. A high voltage (of the order of 300 KV) is applied between the cathode and anode to generate the e-beam which is directed radially inwardly through the anode wall to the gas within the anode structure which is excited thereby to initiate a population inversion, resulting in laser output from the oscillator cavity.

Figure 1:
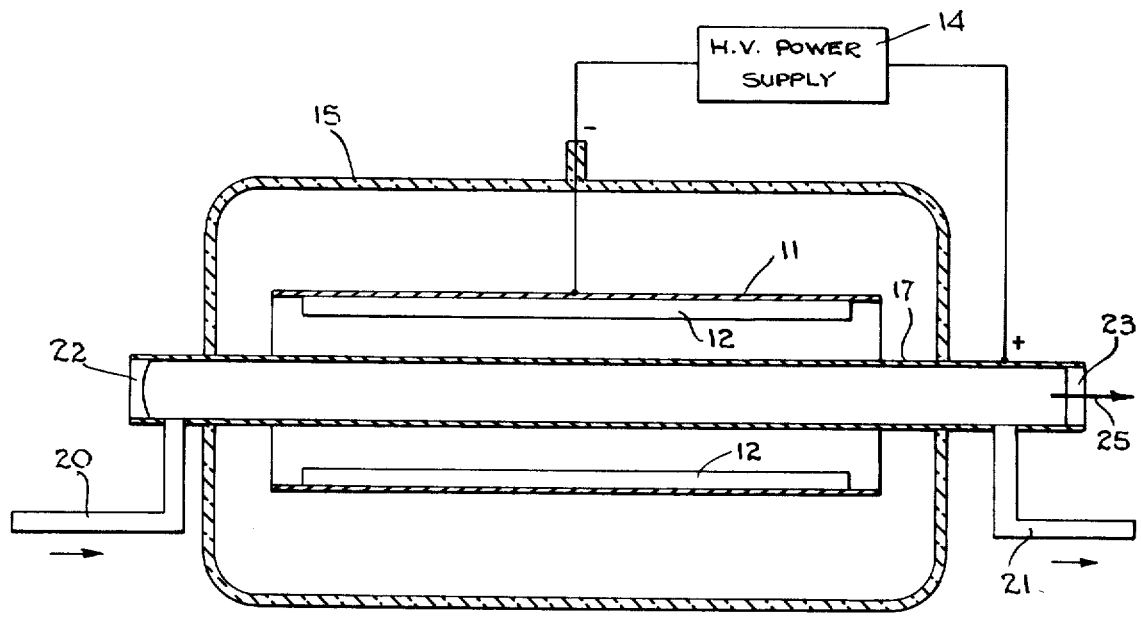
FIG. 1 is a cross-sectional view of a preferred embodiment of the invention.
Figure 2:
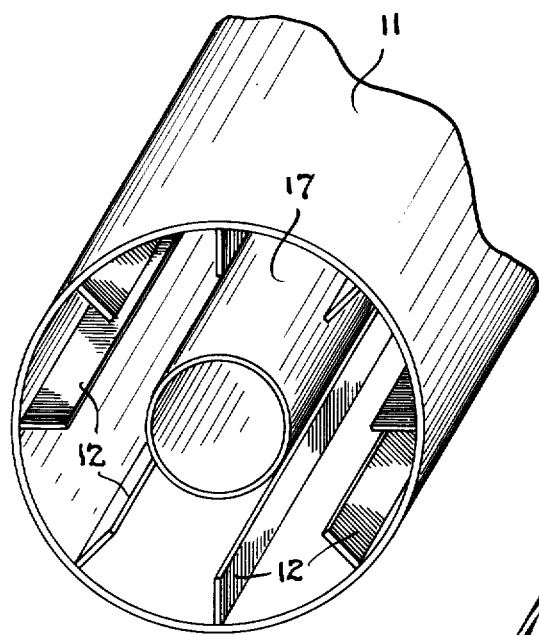
FIG. 2 is a perspective view illustrating the anode and cathode structures of the preferred embodiment.

Referring now to FIGS. 1 and 2, a preferred embodiment of the invention is illustrated. Cathode 11 is formed from a hollow metallic cylinder which typically may have an inside diameter of 8 cm. A plurality of longitudinal blades 12 extend radially inwardly from the inner walls of the cathode. Blades 12 may be fabricated of titanium or stainless steel foil of the order of 0.001 inches in thickness. Blades 12 are utilized as electron emitters and operate at very large local electric fields when they are energized by high voltage power supply 14. Cathode 11 is supported within cylindrical glass envelope 15 by suitable means (not shown), envelope 15 being suitably evacuated to accommodate the e-beam. Supported on envelope 15 in internal concentricity with cathode 11 is hollow cylindrical anode member 17. A pressure tight seal is formed between the outer wall of anode member 17 and envelope 15 where the anode member passes through the envelope. Anode 17 may be formed from titanium or aluminum foil which is made into a leakproof tube. Typically, anode 17 may have an inside diameter of 1 inch and wall thickness of the order of 0.0013 cm. The impedance of the "diode" formed by the anode and cathode can be matched to that of power supply 14 by varying the number of blades 12.

Anode tube 17 is appropriately sealed at its opposite ends to form a chamber for the lasing gas which is pumped into the tube through line 20, line 21 forming a gas outlet. A fully reflective mirror 22 is located on one end of tube 17, with a partially reflective mirror 23 being located on the other end, thereby forming a laser oscillator cavity. Electron beam excitation is provided by means of power supply 14 which is connected between cathode 11 and anode 17. Typically, the voltage output of power supply 14 may be 300 kV.

In one operative embodiment of the device of the invention, anode cylinder 17 has a wall thickness of 0.0013 cm, a length of 40 cm, and an outside diameter of 3 cm. Six titanium foil blades equally spaced around the inner circumference of cathode 11 were utilized, these blades being 0.5 cm wide and having a thickness of 0.0025 cm. Cathode 11 was 20 cm long and had an inside diameter of 8 cm, to give a minimum anode-cathode spacing of 2 cm. An Ar-$N_2$ mixture was used with a mixture of 5% nitrogen and 95% argon at 1.7 atmospheres pressure. With this setup, laser pulses of 300 kW having pulse widths of 40 ns FWHM were obtained at 3477A.

In operation, electrons emitted from the blades 12 pass through the thin wall of anode 17 to excite the lasing gas contained within the anode tube and effect a population inversion resulting in the generation of laser output beam 25.

Figure 3:
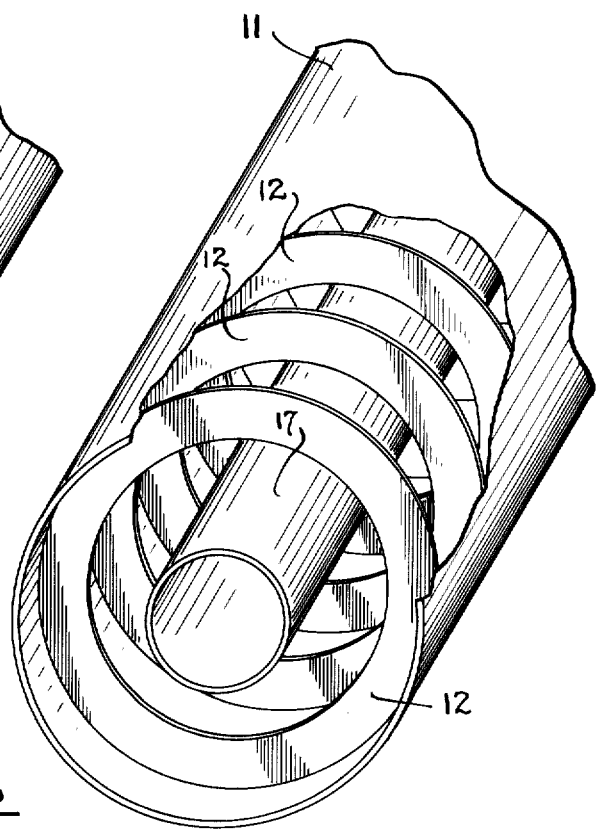
FIG. 3 is a perspective view illustrating an alternative configuration for the cathode structure.

Referring now to FIG 3, a second embodiment having an alternative configuration for the cathode blade member 12 is shown. In this embodiment, rather than being longitudinal, the cathode blades 12 are in the form of rings concentric with anode 17 which are spaced along the length of the inner wall of cathode member 11. Otherwise, the second embodiment is identical with the first.

The device of this invention thus provides a compact e-beam laser having a substantial improvement in efficiency over prior art devices.

While the invention has been described and illustrated in detail, it is to be clearly understood that this is intended by way of illustration and example only and is not to be taken by way of limitation, the spirit and scope of the invention being limited only by the terms of the following claims.

We claim:

1. A laser comprising:
   a hollow cylindrical cathode member fabricated of an electrically conductive material, a hollow cylindrical anode member having a smaller diameter than said cathode member and being mounted in internal concentricity therewith, means for feeding a lasing gas to within the chamber formed by said cylindrical anode member, said anode member being sealed at the opposite ends thereof to contain said gas, optical reflector means positioned at the opposite ends of said cylindrical anode member for forming a laser oscillator cavity, one of said optical means being only partially reflective, and high voltage means connected between said anode and cathode members to generate an e-beam which penetrates the wall of said cylindrical anode member and excites the gas contained therein to effect a population inversion in said gas, whereby a laser beam is generated and laser energy emitted through said partially reflective optical means.

2. The device of claim 1 wherein said cathode member includes a plurality of thin longitudinal blades spaced axially around the inner walls of said cathode member and extending radially towards said anode member.

3. The device of claim 1 wherein said cathode member includes a plurality of thin circular blades which are spaced from each other axially along the inner wall of said cathode member in concentricity with said anode member, said blades extending radially towards said cathode member.

4. The device of claim 1 wherein said optical means comprises a totally reflective mirror at one end of said cylindrical anode member and a partially reflective mirror positioned on the other end of said cylindrical anode member.

5. The device of claim 1 wherein said anode member is fabricated from a thin metal foil formed into a leak-proof tube for containing the laser gas.

6. The device of claim 1 wherein the lasing gas is a mixture of nitrogen and argon.

* * * * *